(12) United States Patent
Arnault et al.

(10) Patent No.: US 12,470,113 B2
(45) Date of Patent: Nov. 11, 2025

(54) ELECTRICALLY CONDUCTIVE DEVICE WITH CENTERING PROJECTIONS

(71) Applicant: AKTIEBOLAGET SKF, Gothenburg (SE)

(72) Inventors: Benoit Arnault, Saint-Cyr-sur-Loire (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 281 days.

(21) Appl. No.: 18/483,858

(22) Filed: Oct. 10, 2023

(65) Prior Publication Data

US 2025/0119036 A1    Apr. 10, 2025

(51) Int. Cl.
*H02K 11/40*    (2016.01)
(52) U.S. Cl.
CPC .................................. *H02K 11/40* (2016.01)
(58) Field of Classification Search
CPC ...................................................... H02K 11/40
USPC ........................................................ 310/68 R
See application file for complete search history.

(56) References Cited

U.S. PATENT DOCUMENTS

| | | | |
|---|---|---|---|
| 3,271,723 A | 9/1966 | Willing | |
| 3,757,164 A | 9/1973 | Binkowski | |
| 5,812,908 A * | 9/1998 | Larocca | H01R 13/035 |
| | | | 399/90 |
| 7,339,777 B2 * | 3/2008 | Barnard | H01R 39/64 |
| | | | 361/212 |
| 8,169,766 B2 | 5/2012 | Oh et al. | |
| 9,464,672 B2 | 10/2016 | White | |
| 10,253,818 B1 | 4/2019 | Ince et al. | |
| 11,309,775 B2 | 4/2022 | Hubert et al. | |

(Continued)

FOREIGN PATENT DOCUMENTS

JP    H11218143 A    8/1999
JP    2002295492 A    10/2002
(Continued)

OTHER PUBLICATIONS

Unpublished U.S. Appl. No. 18/238,759, Thomas Perrotin, filing date: Aug. 28, 2023.

*Primary Examiner* — Ahmed Elnakib
(74) *Attorney, Agent, or Firm* — J-TEK LAW PLLC; Scott T. Wakeman; Mark A. Ussai

(57) ABSTRACT

An electrically conductive device includes an annular conductor having a centerline and an inner radial end contactable with a shaft with an inner circumferential surface centered about the centerline. A support bracket is formed of an electrically conductive material and includes an inner annular main body with a centerline, the annular conductor being coupled with the main body such that the conductor centerline is coaxial with the bracket centerline, and at least one mounting lug extending radially outwardly from the main body and disposable against a radial mounting surface of an outer member. The mounting lug(s) include first and second centering projections located at first and second predetermined distances from the centerline and being disposable within corresponding openings in the outer member such that the centerline of the conductor is coaxial with the shaft central axis and the conductor inner circumferential surface is centered about the central axis.

20 Claims, 11 Drawing Sheets

(56) References Cited

U.S. PATENT DOCUMENTS

| | | | |
|---|---|---|---|
| 11,773,908 B1* | 10/2023 | Kovacs | F16C 19/14 384/513 |
| 2013/0106236 A1* | 5/2013 | Roman | H02K 11/40 310/239 |
| 2019/0296617 A1 | 9/2019 | Hubert et al. | |
| 2020/0263734 A1 | 8/2020 | Kottapalli et al. | |
| 2021/0293279 A1 | 9/2021 | Hubert et al. | |
| 2021/0310518 A1 | 10/2021 | Berruet et al. | |
| 2021/0310520 A1 | 10/2021 | Arnault et al. | |
| 2021/0364040 A1 | 11/2021 | Arnault et al. | |
| 2021/0364041 A1 | 11/2021 | Berruet et al. | |
| 2025/0043828 A1* | 2/2025 | Kovacs | F16C 33/38 |
| 2025/0043829 A1* | 2/2025 | Perrotin | F16C 41/002 |
| 2025/0119036 A1* | 4/2025 | Arnault | H02K 11/40 |

FOREIGN PATENT DOCUMENTS

| | | | |
|---|---|---|---|
| JP | 3654921 B2 | 6/2005 | |
| JP | 2009243695 A | 10/2009 | |

* cited by examiner

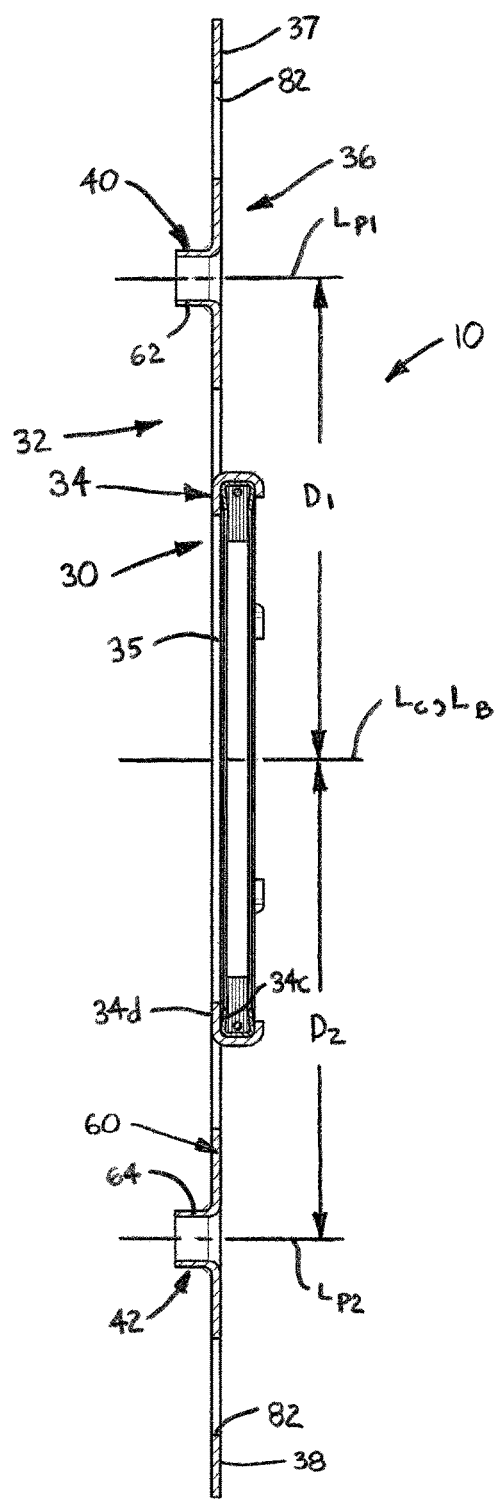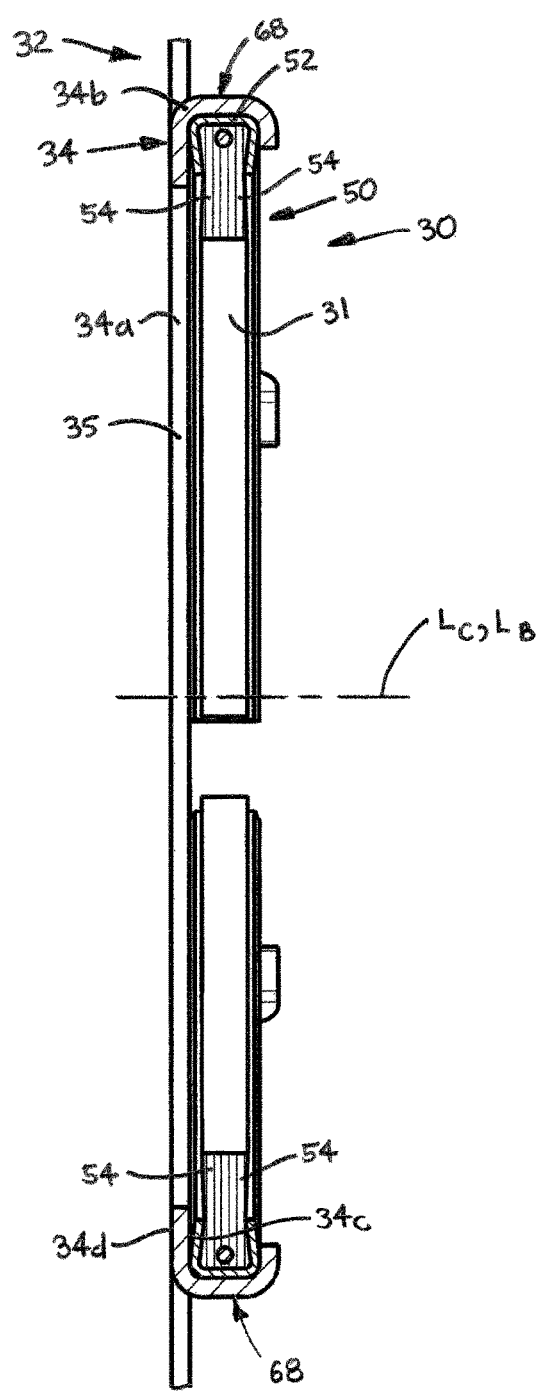
FIG. 4
FIG. 5

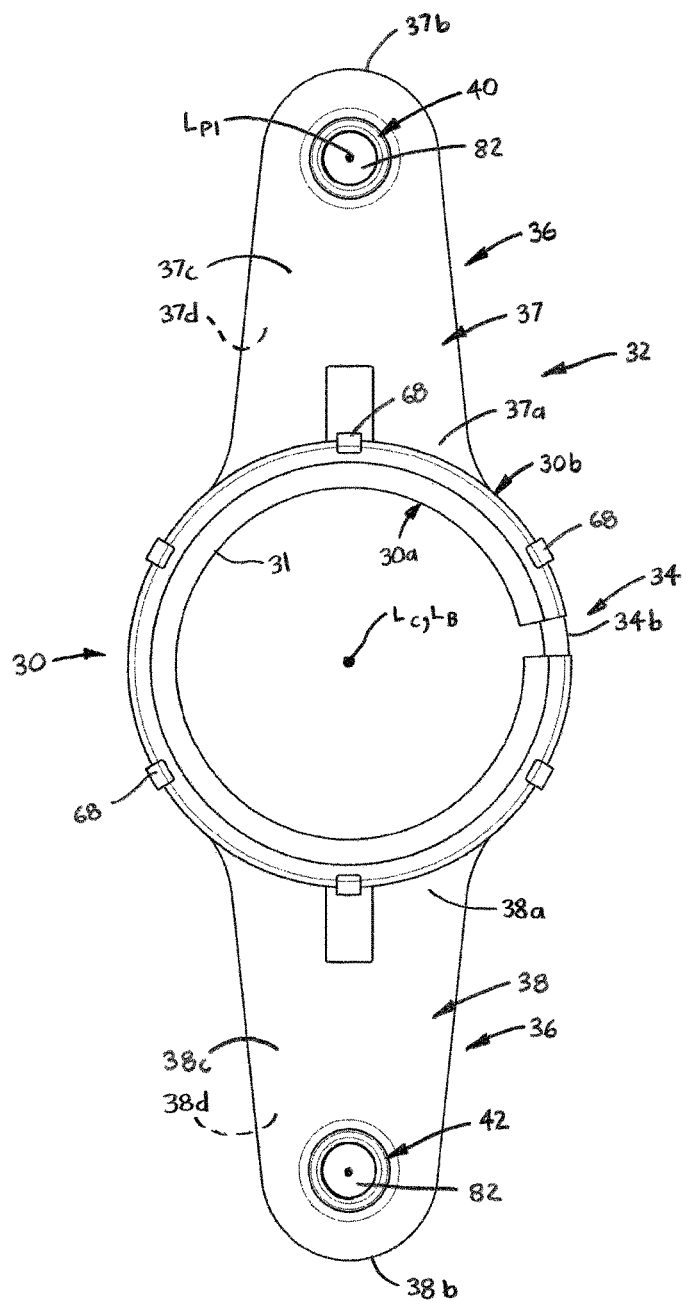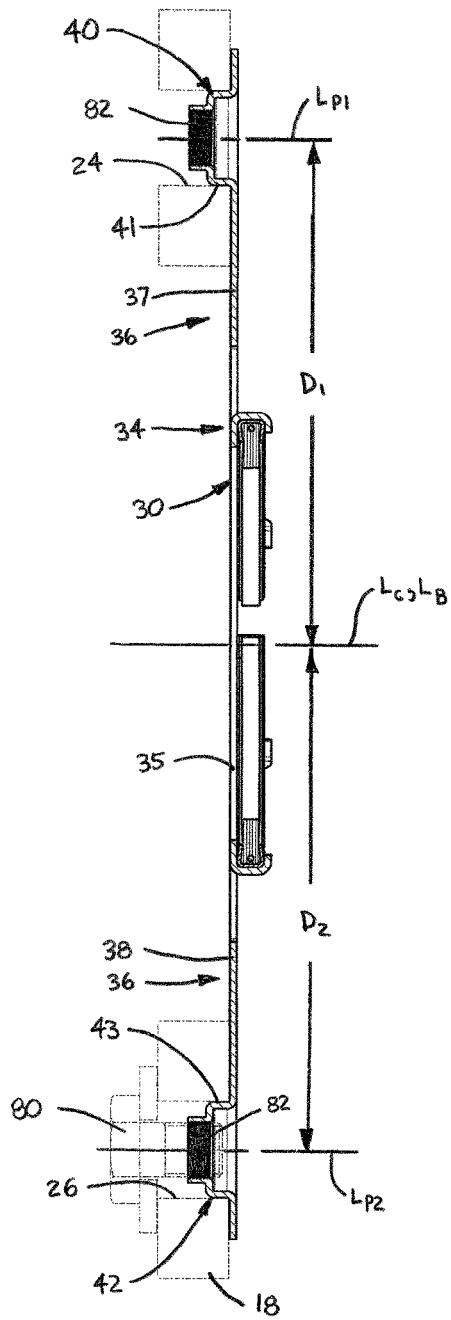
FIG. 8
FIG. 9

ELECTRICALLY CONDUCTIVE DEVICE WITH CENTERING PROJECTIONS

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current resulting from electric charge accumulating on a shaft, and thereby prevent such current from passing through the bearing. These devices often include an annular retainer with an outer rim frictionally engaged with the bore of a housing or hub at a position adjacent to the bearing and a plurality of conductive fibers attached to the retainer and spaced circumferentially about the entire outer surface of the shaft to form a relatively solid ring of fibers. As such, current passes from the shaft through the fibers and the retainer and into the housing/hub.

SUMMARY OF THE INVENTION

In one aspect, the present invention is an electrically conductive device for preventing current flow through the raceways of a bearing, the bearing rotatably coupling a shaft to an outer member, the shaft having a central axis and an outer circumferential surface centered about the central axis, the outer member having at least one radial mounting surface and first and second openings extending inwardly from the at least one mounting surface. The conductive device comprises an annular conductor having a centerline and an inner radial end contactable with the shaft, the inner radial end having an inner circumferential surface centered about the centerline. A support bracket is formed of an electrically conductive material and includes an inner annular main body with a centerline, an inner radial end defining a central opening sized to be spaced radially outwardly from the shaft and an outer radial end, the annular conductor being coupled with the main body such that the conductor centerline is coaxial with the bracket centerline, and at least one mounting lug. The at least one mounting lug extends radially outwardly from the outer radial end of the main body and is disposable against the at least one radial mounting surface of the outer member. The at least one mounting lug includes a first centering projection located at a first predetermined distance from the centerline and a second centering projection located at a second predetermined distance from the centerline and spaced angularly apart about the main body centerline from the first centering projection and/or spaced radially apart from the first centering projection. The first centering projection is disposable within the first opening of the outer member and the second centering projection is disposable within the second opening of the outer member. As such, the centerline of the conductor is coaxial with the shaft central axis and the conductor inner circumferential surface is centered about the central axis, and an electrically conductive path extends between the shaft and the outer member through the conductor and the support bracket.

In another aspect, the present invention is a mechanical assembly for an electric machine, the mechanical assembly comprising a shaft having a central axis and an outer member having a bore, the shaft being disposed within the bore, at least one radial mounting surface, a first locator opening extending into the outer member from the at least one mounting surface and spaced from the central axis by a first predetermined distance and a second locator opening extending into the outer member from the at least one mounting surface and spaced from the central axis by a second predetermined distance. A bearing rotatably couples the shaft with the outer member and has inner and outer raceway surfaces. Further, the mechanical assembly includes an electrically conductive device as described in the preceding paragraph.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 4 is an axial cross-sectional view of the conductive device;

FIG. 5 is a broken-away, enlarged view of a portion of FIG. 4;

FIG. 8 is a front plan view of an alternative construction of a support bracket of the conductive device having connector openings provided by centering projections;

FIG. 9 is an axial cross-sectional view of conductive device of FIG. 8;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
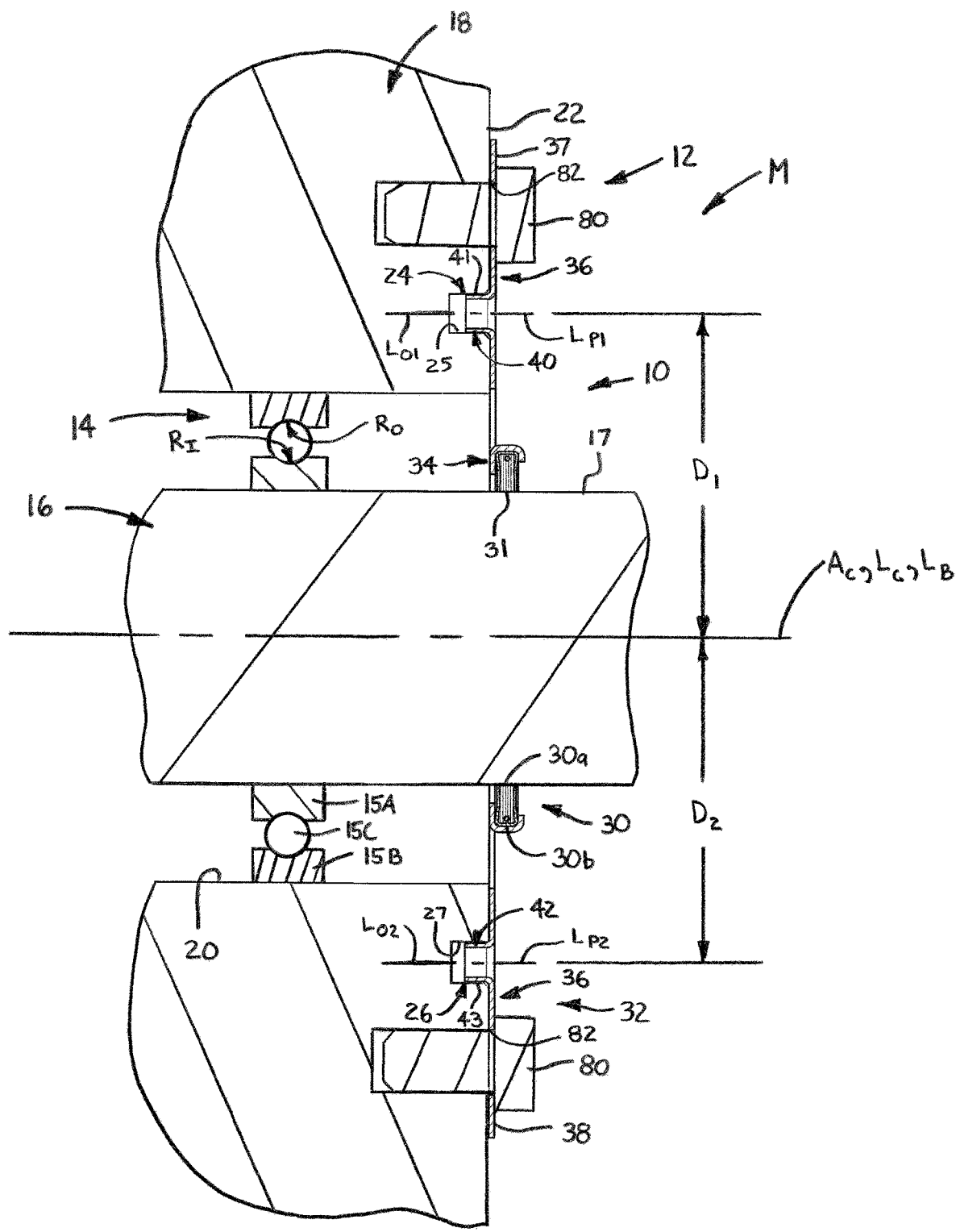
FIG. 1 is an axial cross-sectional view of a conductive device and mechanical assembly of the present invention, shown incorporated into an electric machine.
Figure 2:
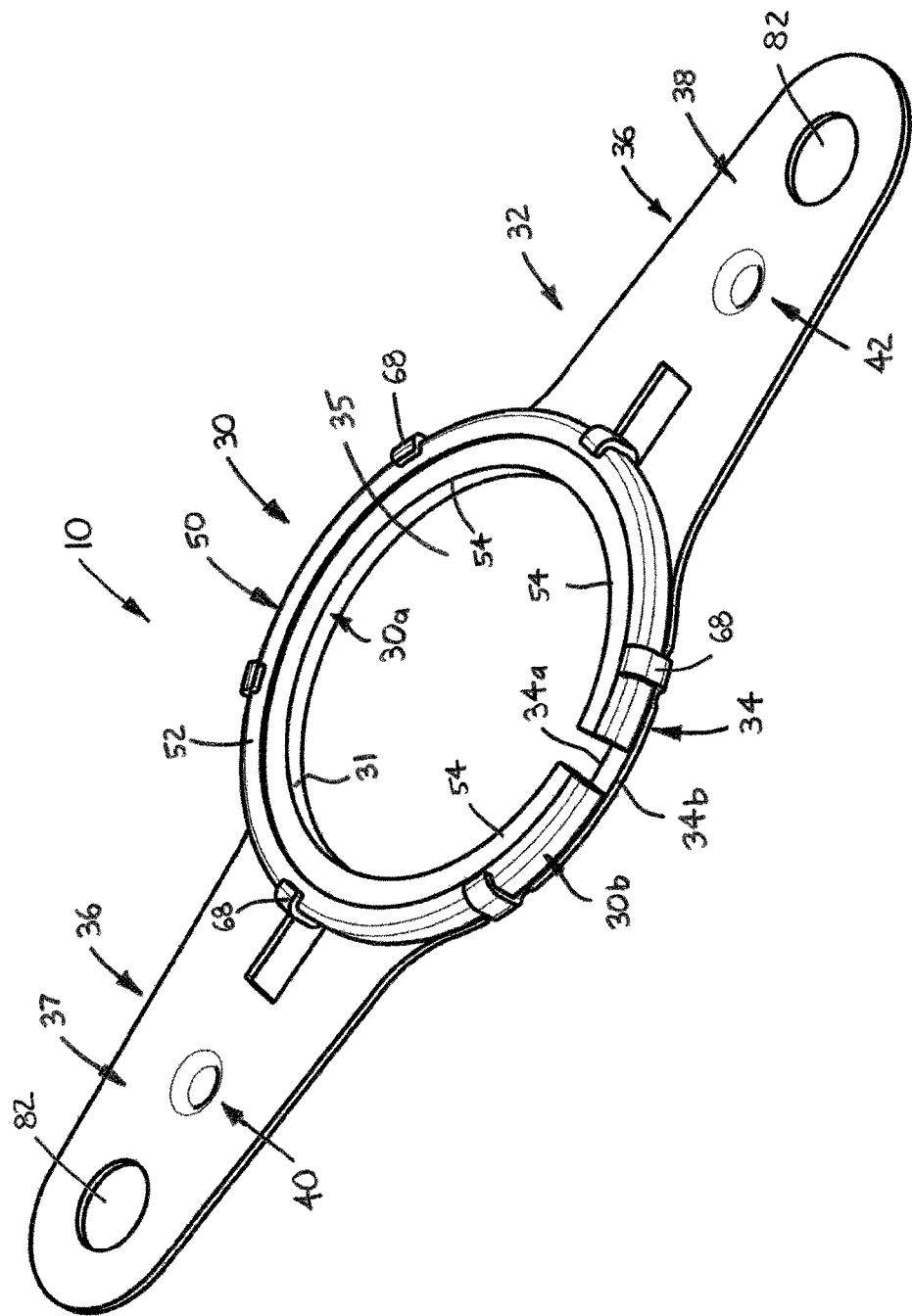
FIG. 2 is a perspective view of the conductive device.

Referring now to the drawings in detail, wherein like numbers are used to indicate like elements throughout, there is shown in FIGS. 1-13 an electrically conductive device 10 for a mechanical assembly 12 of an electric machine M, such as a motor, a generator, etc. The conductive device 10 is configured to prevent current flow through the inner and outer raceways $R_I$, $R_O$ of a bearing 14, so as to prevent damage thereto, by providing an alternative path for electric charge or current, as discussed below. The mechanical assembly 12 further comprises a shaft 16 having a central axis $A_C$ and an outer member 18 (e.g., a housing or a hub) having a bore 20, the shaft 16 being disposed within the outer member bore 20 and having an outer circumferential surface 17. The outer member 18 has at least one radial mounting surface 22 (i.e., extending radially with respect to the central axis $A_C$), a first locator opening 24 extending into the outer member 18 from the at least one mounting surface 22 and spaced from the central axis $A_C$ by a first predetermined distance $D_1$, and a second locator opening 26 extending into the outer member 18 from the at least one mounting surface 22 and spaced from the central axis $A_C$ by a second predetermined distance $D_2$, as indicated in FIG. 1. The radial mounting surface 22 may be a single, continuous surface extending about the central axis $A_C$ or may be provided by two or more separate radial surfaces 22, and in either case, is preferably an exterior surface(s) of the outer member 18.

Further, the bearing 14 rotatably couples the shaft 16 with the outer member 18 such that either the shaft 16 or the outer member 18 rotates about the central axis $A_C$. Preferably, the bearing 14 includes at least one inner ring 15A mounted about the shaft 16 and providing the inner raceway(s) $R_I$, at least one outer ring 15B providing the outer raceway(s) $R_O$, and a plurality of rolling elements 15C disposed between the inner and outer raceways $R_I$, $R_O$. However, the bearing 14 may include one or more outer raceways $R_O$ formed directly in the outer member 18, and thus without a separate outer ring, or may be formed as a plain bearing without any rolling elements.

The conductive device 10 basically comprises an inner annular conductor 30 engageable with the shaft 16 and an outer support bracket 32 connecting the conductor 30 with the outer member 18. The annular conductor 30 has a centerline $L_C$, an inner radial end 30a contactable with the shaft 16 and an opposing outer radial end 30b, the inner radial end 30a having an inner circumferential surface 31 centered about the centerline $L_C$. The support bracket 32 is formed of an electrically conductive material and includes an inner annular main body 34 and at least one mounting lug 36, preferably first and second mounting lugs 37, 38, as described in detail below.

More specifically, the annular main body 34 has a centerline $L_B$, an inner radial end 34a defining a central opening 35 sized to be spaced radially outwardly from the shaft 16, i.e., when the support bracket 32 is connected with the outer member 18, an outer radial end 34b, and opposing first and second axial ends 34c, 34d, respectively. The annular conductor 30 is coupled with the main body 34, as described below, such that the conductor centerline $L_C$ is coaxial with the bracket centerline $L_B$. The at least one mounting lug 36 extends radially outwardly from, and is preferably integrally formed with, the outer radial end 34b of the main body 34 and is disposable against the at least one radial mounting surface 22 of the outer member 18.

Figure 14:
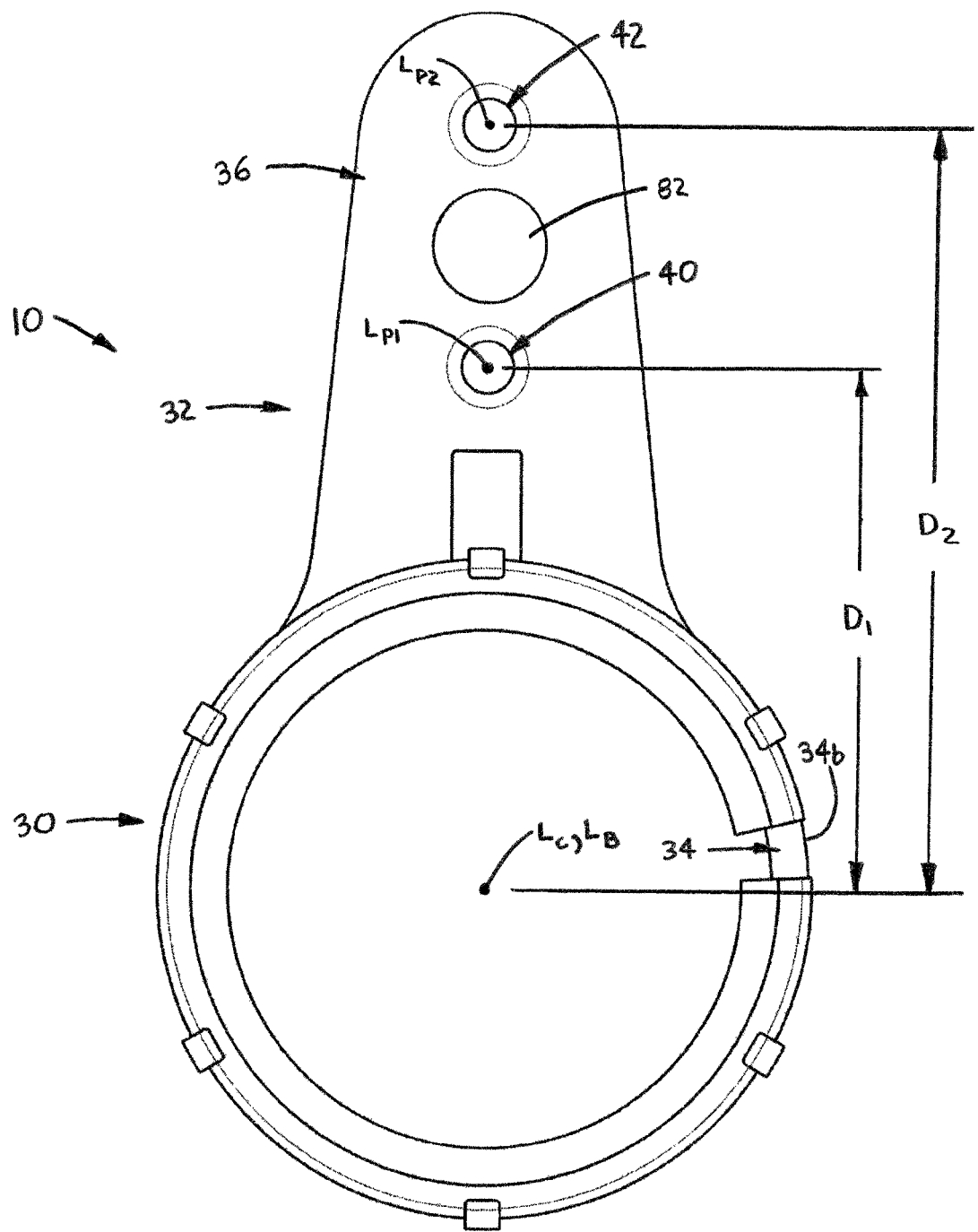
FIG. 14 is a front plan view of an alternative construction of a support bracket of the conductive device having a single mounting lug with radially spaced centering projections.
Figure 15:
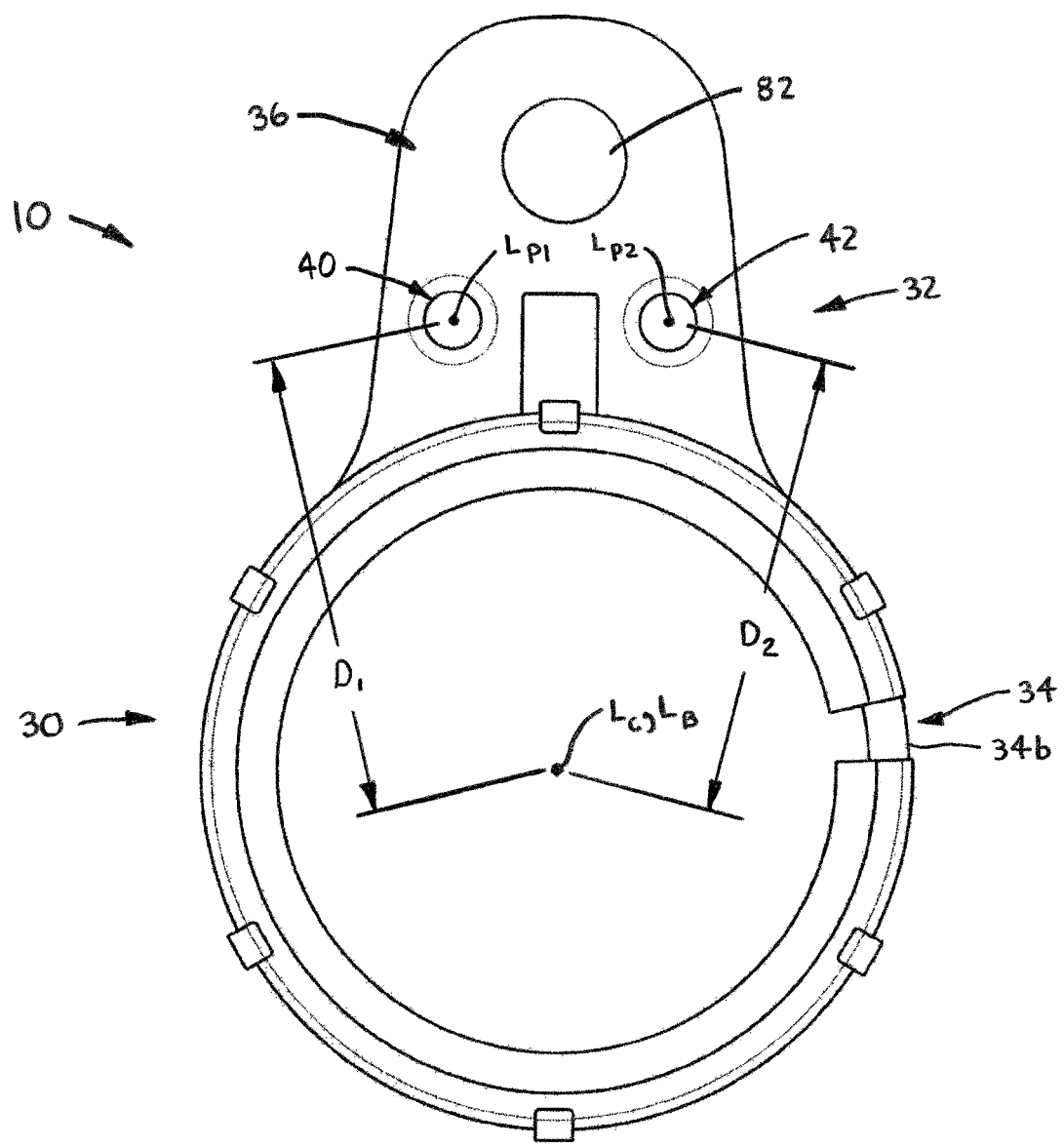
FIG. 15 is a front plan view of an alternative construction of a support bracket of the conductive device having a single mounting lug with angularly spaced centering projections.

Further, the at least one mounting lug 36 includes a first centering projection 40 located at the first predetermined distance $D_1$ from the bracket centerline $L_B$ and a second centering projection 42 located at the second predetermined distance $D_2$ from the bracket centerline $L_B$. The second centering projection 42 is spaced angularly apart about the bracket centerline $L_B$ from the first centering projection 40, as depicted in FIGS. 1-4, 7-9 and 15, and/or is spaced radially apart from the first centering projection 40, as shown in FIG. 14. Preferably, the first predetermined distance $D_1$ is equal to the second predetermined distance $D_2$, but in certain applications, the two distances $D_1$, $D_2$ may be different or unequal, as shown in FIG. 14. Further, with the preferred two mounting lugs 37, 38, the first centering projection 40 is provided on the first mounting lug 37 and the second centering projection 42 is provided on the second mounting lug 38. However, as shown in FIGS. 14 and 15, the first and second centering projections 40, 42 may be provided on a single mounting lug 36.

In any case, when the support bracket 32 is coupled with the outer member 18, the first centering projection 40 is disposed within the first opening 24 of the outer member 18 and the second centering projection 42 is disposed within the second opening 26 of the outer member 18. As such, the centerline $L_C$ of the conductor 30 is thereby positioned coaxial with the shaft central axis $A_C$ and the conductor inner circumferential surface 31 is centered about the central axis $A_C$, while an electrically conductive path extends between the shaft 16 and the outer member 18 through the conductor 30 and the support bracket 32.

Thus, the present conductive assembly 10 provides an alternative path for current, i.e., as opposed to passing through the bearing 14 and specifically the bearing raceways $R_I$, $R_O$, which avoids potential damage to the raceways $R_I$, $R_O$ and the rolling elements 15C. Also, by providing the support bracket 32 with the two centering projections 40, 42, the annular conductor 30 is centered about the shaft 16 immediately upon connecting the support bracket 32 to the outer member 18. As such, uneven wear on the inner radial end 30a of the conductor 30, which could lead to electric discharges or "sparking" that may potentially damage the shaft 16, is avoided. Having described the basic elements and functions above, these and other components of the present conductive device 10 and mechanical assembly 12 are described in greater detail below.

Figure 6:
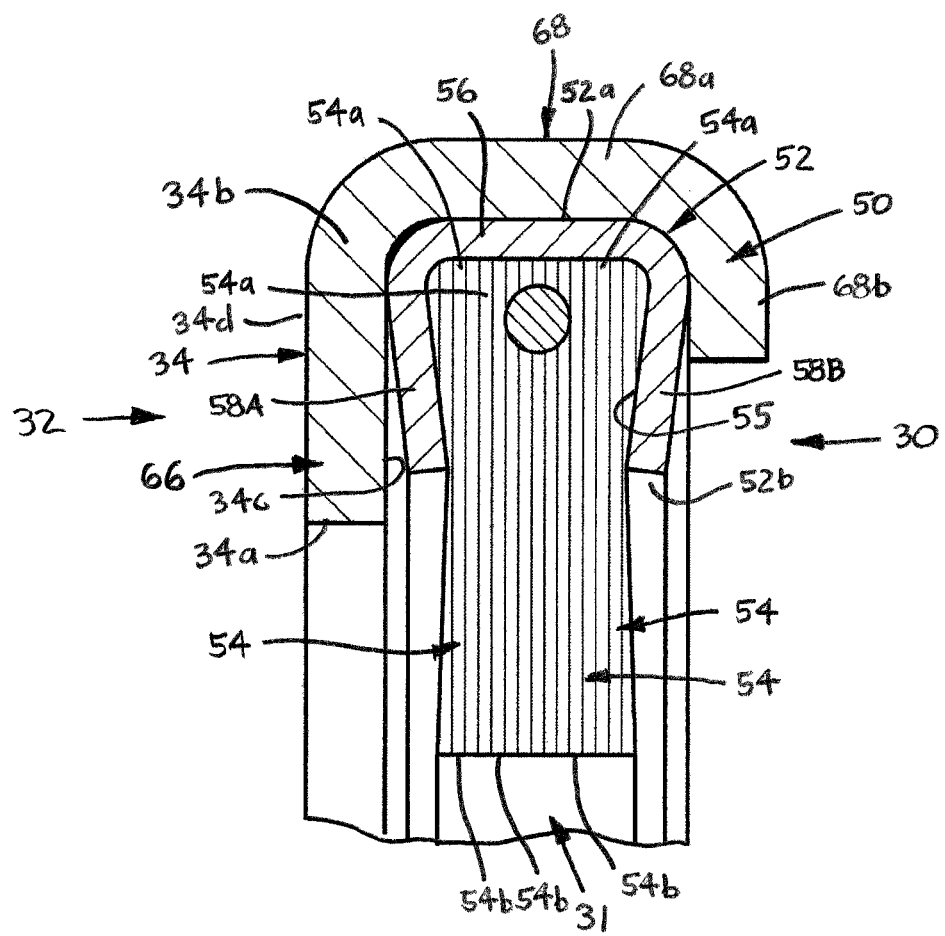
FIG. 6 is broken-away, more enlarged view of a portion of FIG. 4, showing the details of an inner conductor and one retainer tab.

Referring now to FIGS. 5 and 6, the inner conductor 30 is preferably a conductive brush assembly 50 including an outer, annular conductive retainer 52 disposed against the main body 34 of the support bracket 30 and a plurality of conductive fibers 54 extending radially inwardly from the annular retainer 52 and configured to engage with the shaft 16. The annular retainer 52 is preferably formed of a conductive metallic material, most preferably aluminum, but may be formed of another metallic material such as steel or copper, a conductive polymeric material, or any other electrically conductive material. Further, each conductive fiber 22 is preferably formed of carbon, but may alternatively be formed of a metallic material (e.g., copper, aluminum), a conductive polymeric material or any other appropriate material.

Figure 3:
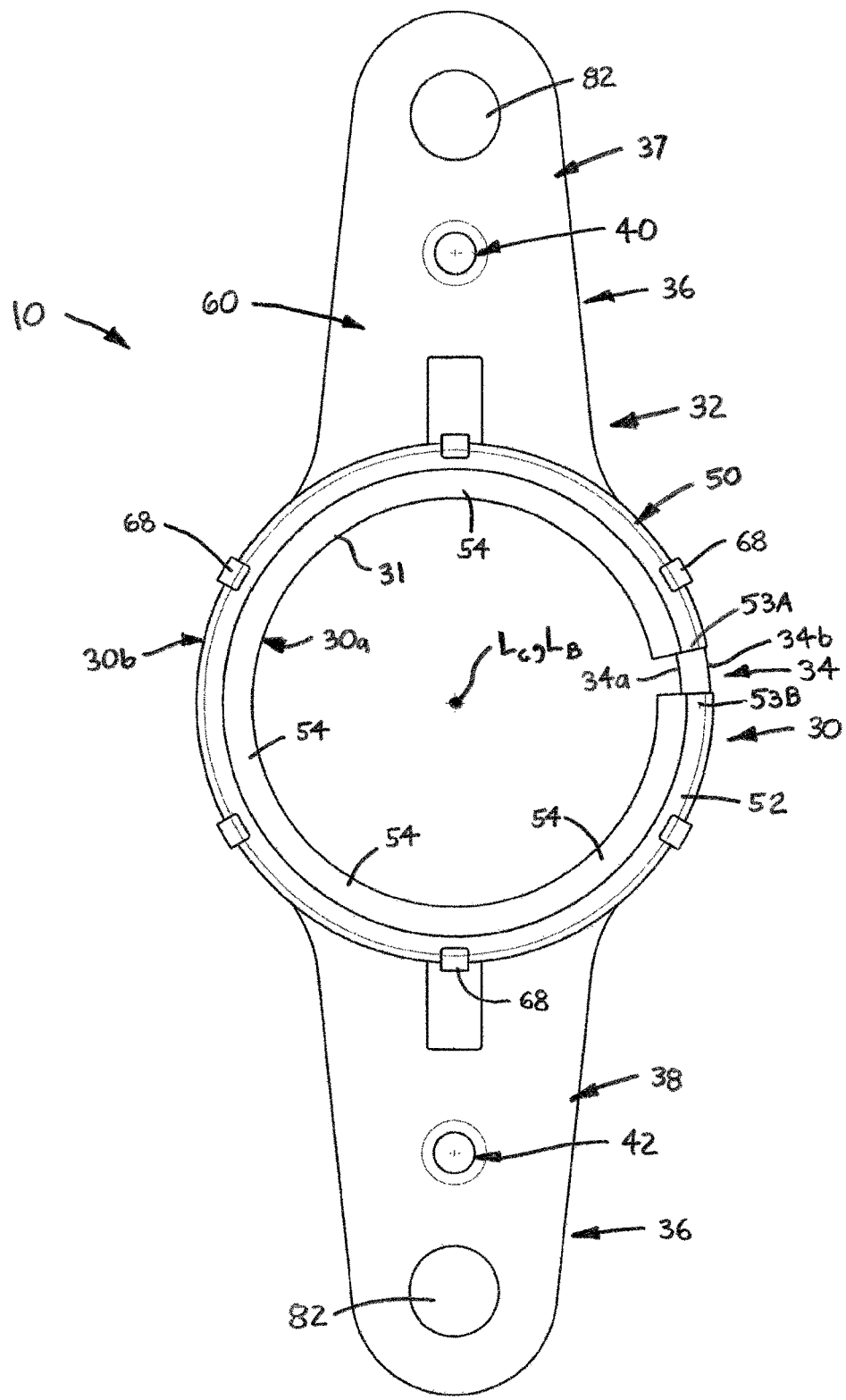
FIG. 3 is a front plan view of the conductive device.

More specifically, the annular conductive retainer 52 has a closed outer radial end 52a providing the conductor outer radial end 30b, an open inner radial end 52b, an annular channel 55 extending radially outwardly from the inner radial end 52b, and two circumferential ends 53A, 53B (FIG. 3). Preferably, the annular conductive retainer 52 is formed so as to include an outer base wall 56 and a pair of sidewalls 58A, 58B extending radially inwardly from the base wall 56 and defining the circumferential channel 55. Furthermore, the plurality of conductive fibers 54 are spaced circumferentially about the centerline $L_C$ of the conductor 30 and are preferably evenly distributed along the entire arcuate perimeter (not indicated) between the circumferential ends 53A, 53B of the annular retainer 52. Also, each conductive fiber 54 has an outer radial end 54a disposed within the channel 55 of the retainer 52 and at least one inner radial end 54b engageable with the shaft 16, the inner radial ends 54b of all of the plurality of conductive fibers 54 collectively defining the inner circumferential surface 31 of the annular conductor 30.

Although the inner annular conductor 30 is preferably formed as a brush assembly 50 that includes the annular retainer 52 and the plurality of conductive fibers 54, the conductor 30 may be formed in any other appropriate manner. For example, the conductor 30 may be formed as an arcuate solid member (not shown) formed of graphite, an electrically conductive polymeric material or any other appropriate electrically conductive material.

Referring now to FIGS. 2, 4 and 7-9, the support bracket 32 is preferably formed as a flat plate 60 providing the main body 34 and the at least one mounting lug 36, with each one of the first and second centering projections 40, 42 being formed as a separate one of two drawn portions 62, 64 (FIG. 4) of the at least one mounting lug 36. That is, the support bracket 32 is preferably formed in a stamping operation from a flat blank (not shown) of a metallic material (e.g., low carbon steel, aluminum) resulting in the flat plate 60 with the one or more mounting lugs 36 and each projection 40, 42 being formed by drawing a localized amount of the metallic material to form each centering projection 40, 42, the projections 40, 42 being subsequently processed by piercing, threading, etc. to form the finished projections 40, 42 as described in detail below. However, when the support bracket 32 is formed of an appropriate non-metallic material (e.g., a conductive polymer), the bracket 32 may be molded or otherwise formed into the flat plate 60 including the projections 40, 42 and other portions of the bracket 32.

Figure 7:
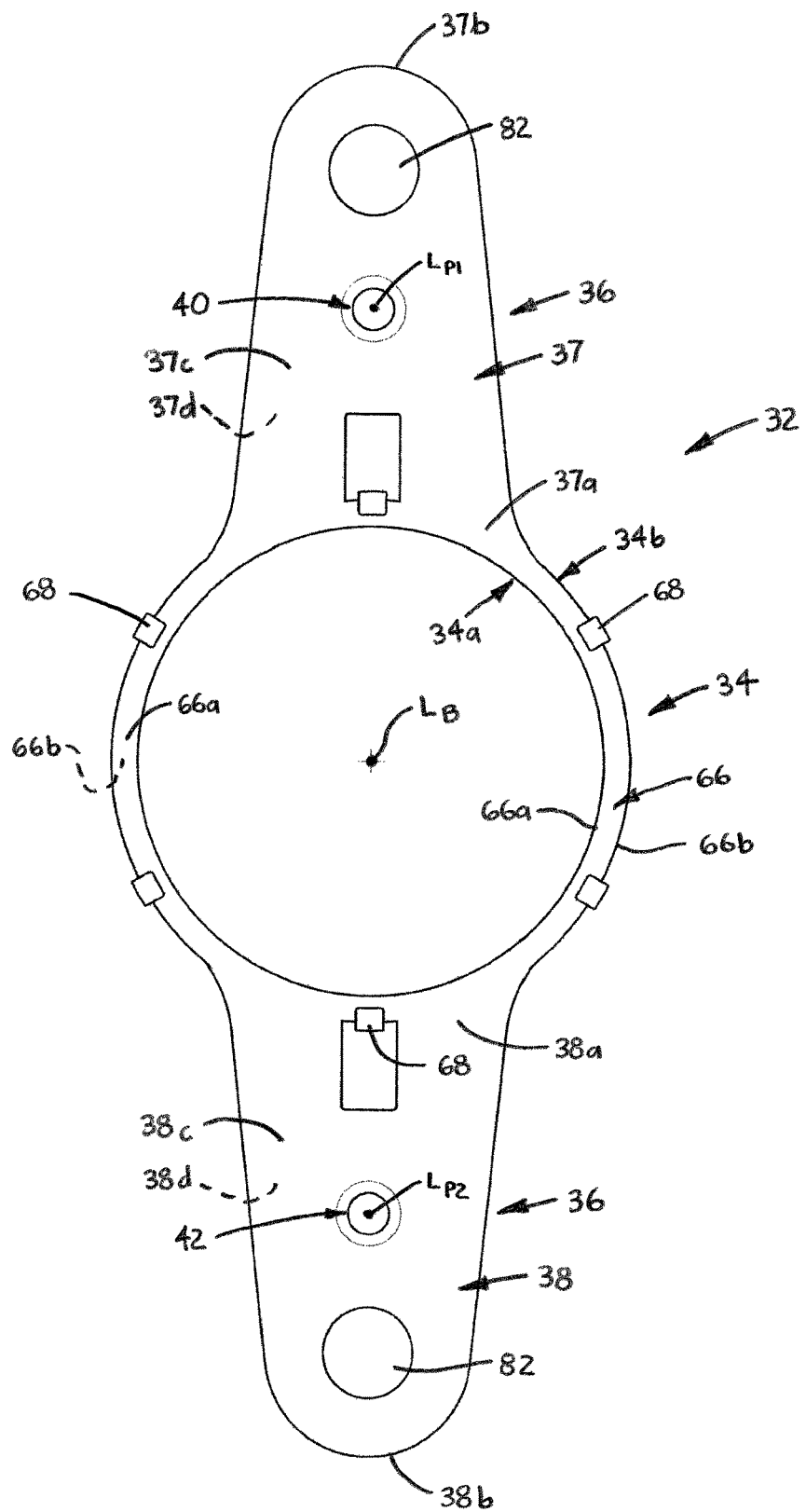
FIG. 7 is a front plan view of a support bracket of the conductive device.

As best shown in FIG. 7, the main body 34 is preferably formed as a flat circular rim 66 having opposing first and second axial ends 66a, 66b and a plurality of integral retainer tabs 68. Each retainer tab 68 extends axially from the outer radial end 34b of the main body 34 and the plurality of tabs 68 are spaced circumferentially about the support bracket centerline $L_B$, each tab 68 engaging with the annular conductor 30 to connect the conductor 30 with the bracket 32. Specifically, each retainer tab 68 has an axial portion 68a extending from the outer radial end 32b of the main body 34 and a radial portion 68b spaced axially from the main body 34 and extending inwardly from the axial portion 68a, as indicated in FIG. 6.

As such, the conductor 30 is axially sandwiched between the bracket main body 34 and the radial portion 68b of each tab 68. With the preferred support bracket 32 being formed by stamping a flat blank, each mounting tab 68 initially extends radially outwardly from the main body 34 and is bent twice to encircle the outer radial end 30b of the conductor 30. However, the support bracket 32 or the conductive device 10 may alternatively be formed to attach the annular conductor 30 to the support bracket 32 by any other appropriate means, such as for example, by separate clip members which attach the conductor 30 to the bracket main body 34, by fasteners that extend through the conductor 30 and the support bracket 32, etc.

Furthermore, with the preferred support bracket 32 having two mounting lugs 37, 38, the lugs 37, 38 are preferably spaced one hundred eighty degrees apart and each has an inner radial end 37a, 38a integrally formed with the main body 34 and an outer radial end 37b, 38b, respectively. Each lug 37, 38 is preferably generally rectangular with a curved outer end 37b, 38a and has opposing first and second axial ends 37c, 37d and 38c, 38d, respectively. In the alternative constructions shown in FIGS. 14 and 15, the support bracket 32 includes only a single mounting lug 36 extending radially from the outer end 34b of the bracket main body 34 and formed generally as described above with the two lugs 37, 38. However, the support bracket 32 may instead include only a single mounting lug 36 extending circumferentially and entirely about the main body 34, such that the main body 34 and the mounting lug 36 are portions of an annular plate, three or more mounting lugs 36 spaced apart in any appropriate manner or the two mounting lugs 37, 38 may be spaced apart by less than one hundred eighty degrees (e.g., one hundred thirty-five degrees, ninety degrees, etc.) (no alternatives shown).

With the two preferred mounting lugs 37, 38, the first centering projection 40 is disposed radially between the inner and outer radial ends 37a, 37b of the first mounting lug 37 and extends axially from the second axial end 37d of the lug 37, thus in an opposite axial direction of the retainer tabs 68 and away from the conductor 30. Similarly, the second centering projection 42 is disposed radially between the inner and outer radial ends 38a, 38b of the second mounting lug 38 and extends axially from the second axial end 38d of the lug 38. Further, as with the two preferred mounting lugs 37, 38, the two centering projections 40, 42 are preferably spaced apart by one hundred eighty degrees as shown, but may be spaced apart by less than one hundred eighty degrees (e.g., by one hundred thirty-five degrees, by ninety degrees, etc.) in certain applications.

Referring particularly to FIGS. 14 and 15, when the support bracket 32 includes only a single mounting lug 36 extending radially outwardly from only an arcuate portion of the main body outer end 34b (i.e., not surrounding the main body 34), the first and second centering projections 40, 42 may be spaced radially apart, but not spaced angularly apart, and located at predetermined distances $D_1$, $D_2$ having different values or magnitudes, as shown in FIG. 14. For example, the second predetermined distance $D_2$ may be greater than the first predetermined distance $D_1$ as depicted in FIG. 14, or vice-versa. Alternatively, the first and second centering projections 40, 42 may be located on a single mounting lug 36 and spaced radially apart, e.g. by about thirty degrees, and either located such that the predetermined distances $D_1$, $D_2$ have the same magnitude or value (as depicted) or different values (not shown).

Referring now to FIGS. 1, 3, 4 and 7-9, each one of the first and second centering projections 40, 42 has a centerline $L_{P1}$, $L_{P2}$, respectively, extending parallel to the centerline $L_B$ of the support bracket 32 and an outer circumferential surface 41, 43, respectively, centered about the projection centerline $L_P$. The centerline $L_{P1}$ of the first projection 40 is spaced from the conductor centerline $L_C$ by the first predetermined distance $D_1$ and the centerline $L_{P2}$ of the second projection 42 is spaced from the conductor centerline $L_C$ by the second predetermined distance $D_2$, as indicated in FIGS. 1, 4 and 9. Further, the outer circumferential surface 41 of the first projection 42 is configured to engage, preferably frictionally, with an inner circumferential surface 25 of the first locator opening 24 of the outer member 18, which is centered about an opening centerline $L_{O1}$, as indicated in FIG. 1. Similarly, the outer circumferential surface 43 of the second projection 42 is configured to engage with an inner circumferential surface 27 of the outer member second locator opening 26 centered about an opening centerline $L_{O2}$, as is also shown in FIG. 1.

Due to the positioning of the projections 40, 42 and the openings 24, 26 and the relative sizing and engagement of the surfaces 41/25 and 43/27, the conductor centerline $L_C$ is at least substantially, and preferably entirely, coaxial with the central axis $A_C$ of the shaft 16 when the projections 40, 42 are disposed within the associated openings 24, 26. As such, the inner surface 31 of the conductor 30 is centered about the central axis $A_C$, and with the preferred brush assembly 50, the inner ends 54b of the plurality of conductive fibers 54 are evenly engaged with the shaft outer surface 17 about the entire circumferential perimeter thereof.

Figure 11:
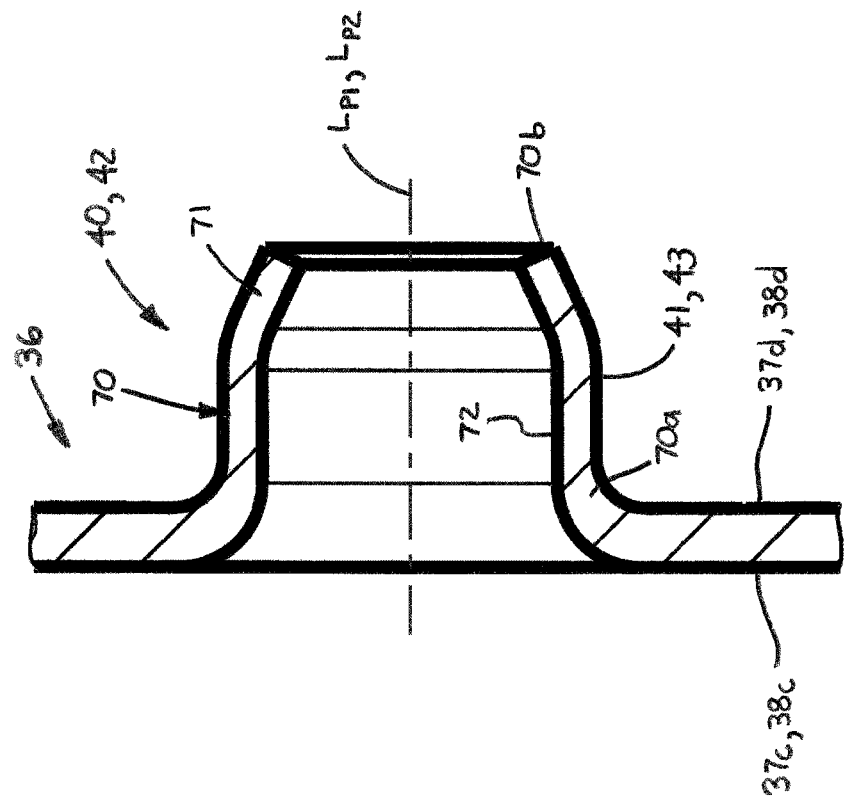
FIG. 11 is more enlarged, axial cross-sectional view of a second construction of the centering projection.
Figure 10:
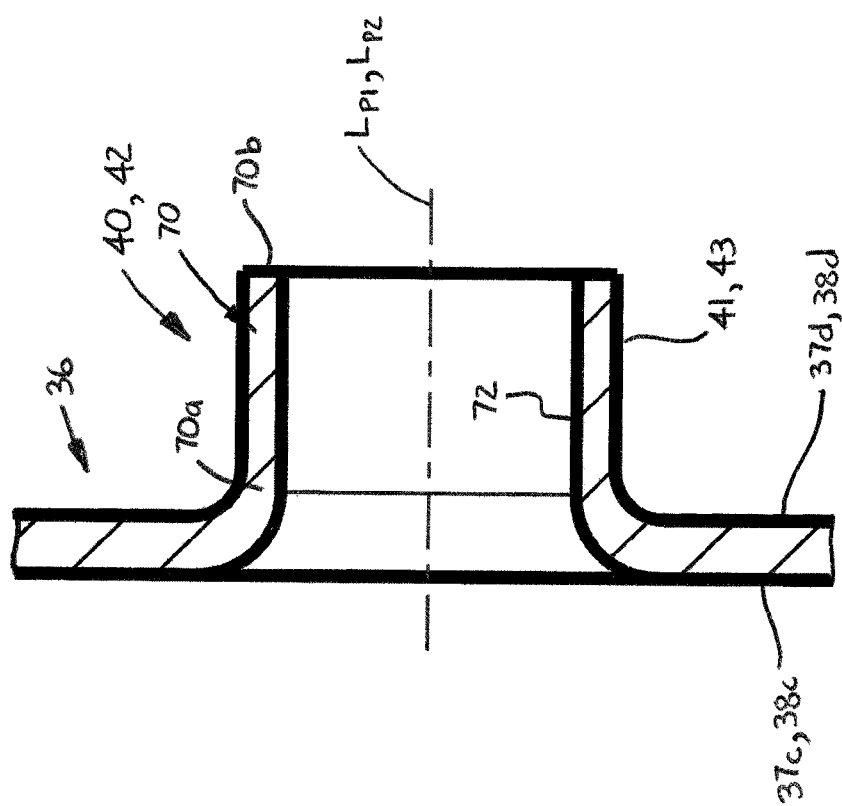
FIG. 10 is a more enlarged, axial cross-sectional view of a first construction of a centering projection.

Referring to FIGS. 10-13, each one of the first and second projections 40, 42 includes a circular tubular sidewall 70, which provides the projection outer circumferential surface 41 or 43 and further has an inner circumferential surface 72. Specifically, each tubular sidewall 70 has an inner axial end 70a integrally formed with the at least one mounting lug 36 and an opposing, free outer axial end 70b. In certain applications, the sidewall 70 may have an inwardly tapered or chamfered outer portion 71 to facilitate insertion into the openings 24, 26, as shown in FIG. 11.

Figure 13:
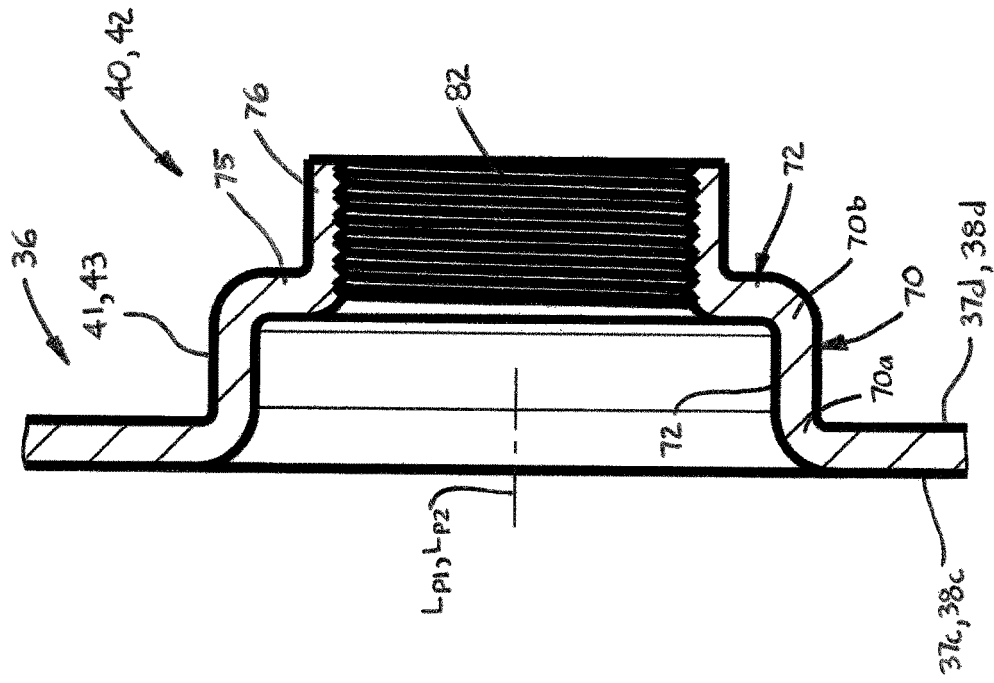
FIG. 13 is a more enlarged, axial cross-sectional view of a fourth construction of the centering projection.
Figure 12:
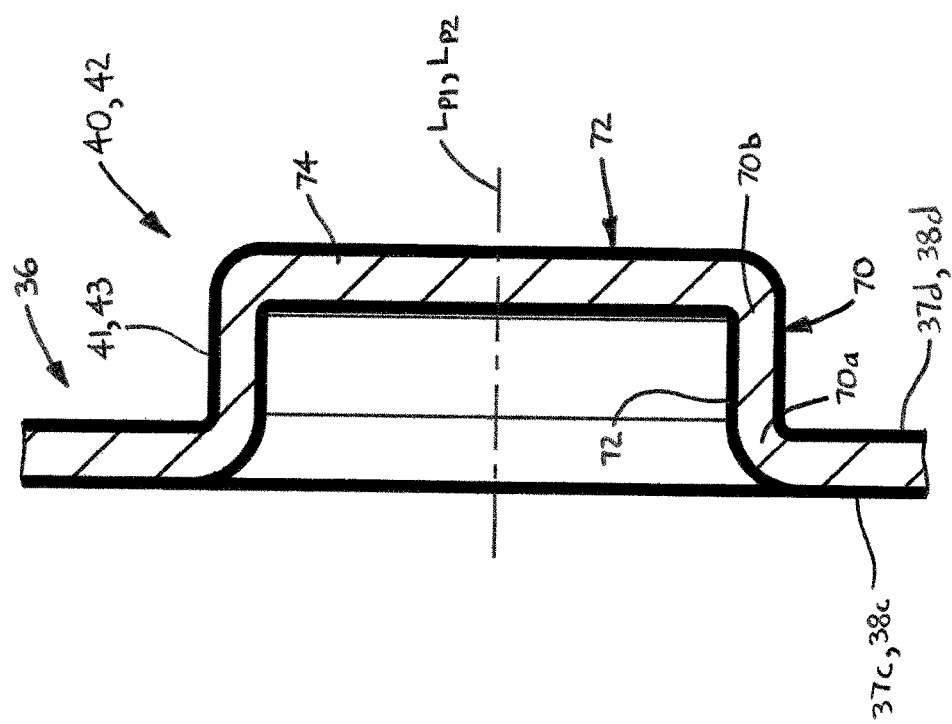
FIG. 12 is a more enlarged, axial cross-sectional view of a third construction of the centering projection.

Further, in some constructions as shown in FIGS. 12 and 13, each projection 40, 42 has an endwall 72 integrally formed with the outer axial end 70b of the tubular sidewall 70b. In one construction shown in FIG. 12, the endwall 72 is formed as a circular plate 74 and entirely closes the end of the projection 40, 42, such that the projection 40, 42 is inserted into the associated opening as 24, 26 in a "blind" assembly process. Alternatively as depicted in FIG. 13, the endwall 72 is formed as an annular rim 75 with a central axial hub 76, the hub 76 being threaded and configured to be engaged by a fastener 80, as shown in FIG. 9 and discussed below, in order to connect the at least one mounting lug 36 with the outer member 18.

Referring to FIGS. 1-4 and 7-9, the conductive device 10 is preferably attached to the radial mounting surface(s) 22 of the outer member 20 by at least one and preferably two fasteners 80, which are each preferably threaded rods or bolts. Specifically, the at least one mounting lug 36 includes at least one and preferably two connector openings 82 for receiving a separate one of the two fasteners 80 to thereby connect the support bracket 32 to the outer member 18, such that at least a portion of the mounting lug(s) 36 is/are disposed against the radial mounting surface(s) 22. With the preferred two mounting lugs 37, 38, each mounting lug 37, 38 includes one of the two connector openings 82, although with a single mounting lug 36 as shown in FIGS. 14 and 15, only a single connector opening 82 may be provided.

Further, each connector opening 82 is either configured to receive the associated fastener 80 with clearance, as shown in FIG. 1, or is configured to be threadably engaged by the fastener 80, as depicted in FIG. 9. Further, in most constructions, each connector opening 82 is formed separately of and spaced from one of the centering projections 40, 42, preferably radially outwardly from the one projection 40, 42. However, as depicted in FIGS. 8, 9 and 13, the connector opening 82 may be provided by the threaded hub 76 formed in the one construction of the centering projections 40, 42 as described above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An electrically conductive device for preventing current flow through the raceways of a bearing, the bearing rotatably coupling a shaft to an outer member, the shaft having a central axis and an outer circumferential surface centered about the central axis, the outer member having at least one radial mounting surface and first and second openings extending inwardly from the at least one mounting surface, the conductive device comprising:

an annular conductor having a centerline and an inner radial end contactable with the shaft, the inner radial end having an inner circumferential surface centered about the centerline; and a support bracket formed of an electrically conductive material and including an inner annular main body with a centerline, an inner radial end defining a central opening sized to be spaced radially outwardly from the shaft and an outer radial end, the annular conductor being coupled with the main body such that the conductor centerline is coaxial with the bracket centerline, and at least one mounting lug extending radially outwardly from the outer radial end of the main body and disposable against the at least one radial mounting surface of the outer member, the at least one mounting lug including a first centering projection located at a first predetermined distance from the bracket centerline and a second centering projection located at a second predetermined distance from the bracket centerline and spaced angularly apart about the bracket centerline from the first centering projection and/or spaced radially apart from the first centering projection, the first centering projection being disposable within the first opening of the outer member and the second centering projection being disposable within the second opening of the outer member such that the centerline of the conductor is coaxial with the shaft central axis and the conductor inner circumferential surface is centered about the central axis, an electrically conductive path extending between the shaft and the outer member through the conductor and the support bracket.

2. The conductive device as recited in claim 1, wherein the first predetermined distance is equal to the second predetermined distance.

3. The conductive device as recited in claim 1, wherein each one of the first and second centering projections has a centerline extending parallel to the centerline of the support bracket and an outer circumferential surface centered about the projection centerline, the centerline of the first projection being spaced from the conductor centerline by the first predetermined distance and the centerline of the second projection being spaced from the conductor centerline by the second predetermined distance, the outer circumferential surface of the first projection being configured to engage with an inner circumferential surface of the first opening of the outer member and the outer circumferential surface of the second projection being configured to engage with an inner circumferential surface of the second opening of the outer member so as to position the conductor centerline coaxial with the central axis of the shaft.

4. The conductive device as recited in claim 3, wherein each one of the first and second projections includes a circular tubular sidewall providing the projection outer circumferential surface, the tubular sidewall having an inner axial end integrally formed with the at least one mounting lug and an opposing, free outer axial end.

5. The conductive assembly as recited in claim 4, wherein each one of the first and second projections further includes an endwall integrally formed with the outer axial end of the tubular sidewall, the endwall being formed as a circular plate or an annular rim with a central axial hub, the hub being threaded and configured to be engaged by a fastener to connect the at least one mounting lug with the outer member.

6. The conductive device as recited in claim 1, wherein the support bracket is formed as a flat plate providing the main body and the at least one mounting lug, each one of the first and second centering projections being formed as a separate one of two drawn portions of the at least one mounting lug.

7. The conductive device as recited in claim 1, wherein the main body of the support bracket includes a plurality of integral retainer tabs each extending axially from the outer radial end of the main body and spaced circumferentially about the support bracket centerline, each retainer tab being engaged with the annular conductor to connect the conductor with the bracket.

8. The conductive device as recited in claim 1, wherein the at least one mounting lug includes at least one connector opening for receiving a fastener for attaching the support bracket to the outer member, the at least one connector opening being configured to receive the fastener with clearance or configured to be threadably engaged by the fastener and the at least one connector opening being spaced from the first and second projections or extending through one of the first and second centering projections.

9. The conductive device as recited in claim 1, wherein the at least one mounting lug includes a first mounting lug and a second mounting lug, the first and second mounting lugs being spaced angularly apart about the centerline of the mounting plate, the first centering projection extending axially from the first mounting lug and the second centering projection extending axially from the second mounting lug.

10. The conductive device as recited in claim 1, wherein the annular conductor includes:
an annular conductive retainer disposed against the main body of the support bracket and having an outer radial end, an inner radial end and an annular channel extending radially outwardly from the inner radial end; and
a plurality of conductive fibers spaced circumferentially about the centerline, each fiber having an outer radial end disposed within the channel of the retainer and at least one inner radial end engageable with the shaft, the inner radial ends of the plurality of fibers collectively defining the inner circumferential surface of the annular conductor.

11. A mechanical assembly for an electric machine, the mechanical assembly comprising:
a shaft having a central axis;
an outer member having a bore, the shaft being disposed within the bore, at least one radial mounting surface, a first locator opening extending into the outer member from the at least one mounting surface and spaced from the central axis by a first predetermined distance and a second locator opening extending into the outer member from the at least one mounting surface and spaced from the central axis by a second predetermined distance;
a bearing rotatably coupling the shaft with the outer member and having inner and outer raceway surfaces; and
an electrically conductive device for preventing current flow through the inner and outer raceways of the bearing, the conductive device including:
an annular conductor having a centerline and an inner radial end contactable with the shaft, the inner radial end having an inner circumferential surface centered about the centerline; and
a support bracket formed of an electrically conductive material and including an inner annular main body with a centerline, an inner radial end defining a central opening sized to be spaced radially outwardly from the shaft and an outer radial end, the annular conductor being coupled with the main body such that the conductor centerline is coaxial with the bracket centerline, and at least one mounting lug extending radially outwardly from the outer radial end of the main body and disposable against the at least one radial mounting surface of the outer member, the at least one mounting lug including a first centering projection located at the first predetermined distance from the centerline and a second centering projection located at the second predetermined distance from the centerline and spaced angularly apart about the main body centerline from the first centering projection and/or spaced radially apart from the first centering projection, the first centering projection being disposed within the first opening of the outer member and the second centering projection being disposed within the second opening of the outer member such that the centerline of the conductor is coaxial with the shaft central axis and the conductor inner circumferential surface is centered about the central axis, an electrically conductive path extending between the shaft and the outer member through the conductor and the support bracket.

12. The mechanical assembly as recited in claim 11, wherein the first predetermined distance is equal to the second predetermined distance.

13. The mechanical assembly as recited in claim 11, wherein each one of the first and second centering projections has a centerline extending parallel to the centerline of the support bracket and an outer circumferential surface centered about the projection centerline, the centerline of the first projection being spaced from the conductor centerline by the first predetermined distance and the centerline of the second projection being spaced from the conductor centerline by the second predetermined distance, the outer circumferential surface of the first projection being engaged with an inner circumferential surface of the first opening of the outer member and the outer circumferential surface of the second projection being engaged with an inner circumferential surface of the second opening of the outer member so as to position the conductor centerline coaxial with the central axis of the shaft.

14. The mechanical assembly as recited in claim 13, wherein each one of the first and second projections includes a circular tubular sidewall providing the projection outer circumferential surface, the tubular sidewall having an inner axial end integrally formed with the at least one mounting lug and an opposing, free outer axial end.

15. The mechanical assembly as recited in claim 14, wherein each one of the first and second projections further includes an endwall integrally formed with the outer axial end of the tubular sidewall, the endwall being formed as a circular plate or an annular rim with a central axial hub, the hub being threaded and configured to be engaged by a fastener to connect the at least one mounting lug with the outer member.

16. The mechanical assembly as recited in claim 11, wherein the support bracket is formed as a flat plate providing the main body and the at least one mounting lug, each one of the first and second centering projections being formed as a separate one of two drawn portions of the at least one mounting lug.

17. The mechanical assembly as recited in claim 11, wherein the main body of the support bracket includes a plurality of integral retainer tabs each extending axially from the outer radial end of the main body and spaced circumferentially about the support bracket centerline, each retainer tab being engaged with the annular conductor to connect the conductor with the bracket.

18. The mechanical assembly as recited in claim 11, further comprising at least one fastener and wherein the at least one mounting lug includes at least one connector opening for receiving the at least one fastener for attaching the support bracket to the outer member, the at least one connector opening being configured to receive the fastener with clearance or configured to be threadably engaged by the fastener and the at least one connector opening being spaced from the first and second projections or extending through one of the first and second centering projections.

19. The mechanical assembly as recited in claim 11, wherein the at least one mounting lug includes a first mounting lug and a second mounting lug, the first and second mounting lugs being spaced angularly apart about the centerline of the mounting plate, the first centering projection extending axially from the first mounting lug and the second centering projection extending axially from the second mounting lug.

20. The mechanical assembly as recited in claim 11, wherein the annular conductor includes:
 an annular conductive retainer disposed against the base plate and having an outer radial end, an inner radial end and an annular channel extending radially outwardly from the inner radial end; and
 a plurality of conductive fibers spaced circumferentially about the centerline, each fiber having an outer radial end disposed within the channel of the retainer and at least one inner radial end engageable with the shaft, the inner radial ends of the plurality of fibers collectively defining the inner circumferential surface of the annular conductor.

\* \* \* \* \*